United States Patent [19]
Heitmeyer et al.

[11] 4,153,128
[45] May 8, 1979

[54] DRIVE AGGREGATE FOR ELECTRIC VEHICLES

[75] Inventors: Ulrich Heitmeyer, Rosbach von der Höhe; Adrian Kupsa, Düsseldorf; Hans-Joachim Förster, Stuttgart, all of Fed. Rep. of Germany

[73] Assignee: Daimler-Benz Aktiengesellschaft, Fed. Rep. of Germany

[21] Appl. No.: 747,336

[22] Filed: Dec. 3, 1976

[30] Foreign Application Priority Data

Dec. 4, 1975 [DE] Fed. Rep. of Germany ....... 2554548

[51] Int. Cl.² ............................................... B60K 1/00
[52] U.S. Cl. ..................................... 180/65 E; 74/866; 318/139
[58] Field of Search ............................ 180/65 R, 65 E; 318/139; 74/866, 867, 868, 869, 720.5, 740

[56] References Cited

U.S. PATENT DOCUMENTS

| | | | |
|---|---|---|---|
| 3,216,541 | 11/1965 | Steffen | 74/720.5 |
| 3,572,167 | 3/1971 | Bosko et al. | 74/740 |
| 3,673,890 | 7/1972 | Crooks | 74/740 |
| 3,861,485 | 1/1975 | Busch | 180/65 R |
| 3,905,252 | 9/1975 | Zaiser | 74/740 |
| 3,915,251 | 10/1975 | Kassekert et al. | 180/65 R |
| 3,938,409 | 2/1976 | Uozumi | 74/869 |
| 3,984,742 | 10/1976 | Bader | 180/65 R |
| 4,021,712 | 5/1977 | Ishihara | 180/65 R |

*Primary Examiner*—David M. Mitchell
*Attorney, Agent, or Firm*—Craig & Antonelli

[57] ABSTRACT

A drive aggregate for electric vehicles, especially for trackless street vehicles, which is equipped with an electric shunt motor provided with field current control and with a change-speed transmission having at least two forward speeds connected behind the electric shunt motor; the electric shunt-wound motor thereby has a relatively high rated rotational speed in relation to its maximum rotational speed and a relatively reduced field-weakening range whereby the change-speed transmission is an automatic transmission connected with the electric shunt motor by way of a speed-reducing gear while the oil pump of the automatic transmission is driven by an electric motor coordinated thereto which operates at substantially constant rotational speed.

14 Claims, 5 Drawing Figures

DRIVE AGGREGATE FOR ELECTRIC VEHICLES

The present invention relates to a drive aggregate for electric vehicles, especially for trackless street vehicles, equipped with a shunt-wound electric motor with field-current regulation and with a change-speed transmission having at least two forward speeds connected behind the electric motor.

The range of electric vehicles is limited by the low storage density of the batteries and the load is restricted in such vehicles.

In order to keep these disadvantages as small as possible, it is necessary:

(1) that the converted energy is processed with the highest possible efficiency,
(2) that an increased attention is paid to energy recovery due to braking of the vehicle, and
(3) that the overall weight of the installation is kept as small as possible.

Electric vehicles are still so expensive that they cannot compete from a cost point of view with internal combustion engine vehicles. The high costs result, in addition to the high price for the batteries, on the one hand, from the use of an energy electronic system for the control of the armature voltage and on the other from the use of vehicle motors with a large field-weakening range, i.e., with a high rated torque. The torques to be demanded with a view to overcoming steep road sections or ramps therebeyond require high wheel torques which have to be realized by an increase of the motor and by an overdimensioned electronic power system.

Numerous proposals have been made in recent times which aim at creating a drive aggregate for electric vehicles that is connected with low costs and high operating comfort. However, these prior art proposals, as already mentioned, use either a costly energy electronic system in the armature current circuit or motors with a large field-weakening range and thus entail the aforementioned disadvantages.

It is the aim of the present invention to provide a drive aggregate which does not exhibit these disadvantages, is more favorable from a cost point of view and offers a high operating comfort.

The underlying problems are solved according to the present invention in that the electric shunt-wound motor has a high rated rotational speed with respect to the maximum rotational speed and a reduced field-weakening range and in that an automatic change-speed transmission is connected with this shunt-motor by way of a speed-reducing gear, whose oil pump is driven by an electric motor with constant rotational speed coordinated thereto.

As a result of the increased rated speed, which is increased with respect to the maximum rotational speed, the rated torque is reduced and, as a consequence thereof, also the dimensions and weight of the motor. The moment of inertia of the motor is reduced by reason of the reduced rotor dimensions, whence the shifting of the speeds is facilitated in view of the shifting heat produced in the transmission. The reduced field-weakening range together with the high transmission ratio of the automatic transmission assures an overall control range which is sufficiently large with a control of the motor in the field-weakening range of about 2:1 to about 2.5:1.

As a result of these measures a motor designed for small torque superincreases or overloads is realized which becomes small and inexpensive and operates within its operating range with high efficiency.

In the design of the installation, attention must be paid, of course, to the fact that the additional or auxiliary aggregates, in this case the transmission, operate with highest possible efficiencies.

Since the purely electric solution makes unnecessary any transmission shifting and therewith the electric motor vehicle becomes completely non-problematic in its operation, it is appropriate to permit the transmission which is provided according to the present invention, to shift completely automatically. One will derive particular advantages therefrom if one permits the transmission to operate within a rotational speed range, at which the transmission losses are at a minimum.

In the proposed solution according to the present invention, a continuously rotating transmission which runs along permanently, is interconnected for that purpose between the electric shunt motor and the automatic transmission, whose speed reduction is so selected that the transmission losses are as small as possible.

In a first embodiment, this auxiliary transmission is additionally used as starting coupling in that at first the brake is disengaged and this brake is engaged for the coupling operation. Since the electric motor without armature current control does not possess any operating point in a small lower velocity range, this starting coupling can also be operated with continuous slippage within this range. The corresponding oil cooling is provided therefor.

High losses are avoided by the separate oil pump driven by an electric motor operating at constant rotational speed, which losses would otherwise occur if an oil pump driven by the input shaft of the automatic transmission supplies at high motor rotational speeds, considerably more oil than necessary.

By reason of the transmission ratios, high wheel torques can be produced at small motor torques. As a result thereof, no superincreased or overload motor currents are necessary, which would load the batteries particularly heavily and would reduce the energy content thereof disproportionately. Simultaneously therewith, with strongly reduced motor currents, there results the possibility to decrease the battery voltage. With a reduced battery voltage, however, the energy stored per unit weight can be considerably increased as is known.

Notwithstanding the used automatic transmission, an electric braking with energy regeneration is possible. This takes place in the individual speeds in such a manner that with each motor rotational speed, the energizing current is so adjusted by conventional means that the induced counter-voltage of the motor is so large as is necessary for the generation of the necessary brake current.

When dropping below a predetermined rotational speed, below which it is no longer possible to brake, an automatic shifting into the next lower speed will take place so that the desired deceleration of the vehicle can be realized with energy regeneration. In the non-controllable portion of the drive characteristics, i.e. the starting range, which extends from standstill to a velocity of about 8 km/h, a braking with energy regeneration is not possible.

Various constructions are feasible with the described combination.

One possible embodiment in accordance with the present invention is so constructed that an armature current regulating unit is provided which is designed only for an armature current coordinated to the rated torque of the overall transmission and which has no installation for regenerative braking. Since only the starting range has to be bridged by means of the armature current regulating unit and additionally a high starting torque is produced by the first transmission speed, the motor itself has to produce only a small torque. Correspondingly, the armature current regulating unit can be designed for an armature current which is considerably lower than the rated current of the motor. After passing through the armature-adjusting or regulating range in the first transmission speed, the armature regulating unit is bridged by a relay or contactor. As a result thereof, the armature regulating unit becomes considerably more inexpensive than the regulating units or control elements designed for the full motor current. Since the regenerative braking takes place within the field-weakening range, also the installation for the energy regeneration in the armature current regulating unit or control element may be dispensed with. As a result of the described measures, the armature current regulating unit or control element can be reduced as regards its design current by the factor of about 3:1 and as regards the technical expenditures up to about 5:1 with respect to the customary armature current control elements or regulating units.

A second embodiment of the present invention is so constructed that a series circuit of a starting resistance and of an auxiliary relay or contactor is provided in the armature current and in that a main relay or contactor actuated by the drive switch is connected in parallel thereto, and in that a hydrodynamic coupling or a hydrodynamic torque converter is arranged between the electric shunt-motor and the speed reduction gear. The armature current regulating unit or control element is absent in this case and is replaced by a hydrodynamic coupling or hydrodynamic torque converter, and the motor is started in idling by way of a starting resistance.

A third embodiment of the present invention is so constructed that a series circuit of a starting resistance of an auxiliary relay or contactor is provided in the armature current circuit and that a main relay or contactor actuated by the drive switch is connected in parallel thereto, and in that a planetary gear set with a lamellae brake is arranged between the shunt-motor and the automatic transmission. By reason of the fact that in this solution the entire power flow is conducted, not by way of oil, but exclusively by way of mechanical transmission elements, the efficiency of this drive system is particularly good.

Accordingly, it is an object of the present invention to provide a drive unit for electric vehicles which avoids by simple means the aforementioned shortcomings and drawbacks encountered in the prior art.

Another object of the present invention resides in a drive aggregate for electric vehicles which insures a high efficiency for the energy conversion while energy regeneration from vehicle braking is duly considered.

A further object of the present invention resides in a drive aggregate for electric vehicles which increases the range of the vehicle as well as its load-carrying capacity.

A still further object of the present invention resides in a drive aggregate for electric vehicles which is characterized by an extraordinarily low overall weight of the installation.

Another object of the present invention resides in a drive unit for electric vehicles which obviates the need of oversize electronic power control units and enlarged electric motors to provide the necessary wheel torques for proper operation of the vehicle under all circumstances.

A further object of the present invention resides in an electric vehicle which is connected with low costs and high operating comforts.

A further object of the present invention resides in a drive unit for an electric vehicle which excels by relatively low costs without impairment of the driving comfort.

Still a further object of the present invention resides in a drive aggregate for electric vehicles, in which the moment of inertia of the motor is reduced, thereby facilitating the shifting operations.

These and other objects, features and advantages of the present invention will become more apparent from the following description when taken in connection with the accompanying drawing which shows, for purposes of illustration only, several embodiments in accordance with the present invention, and wherein.

Figure 1:
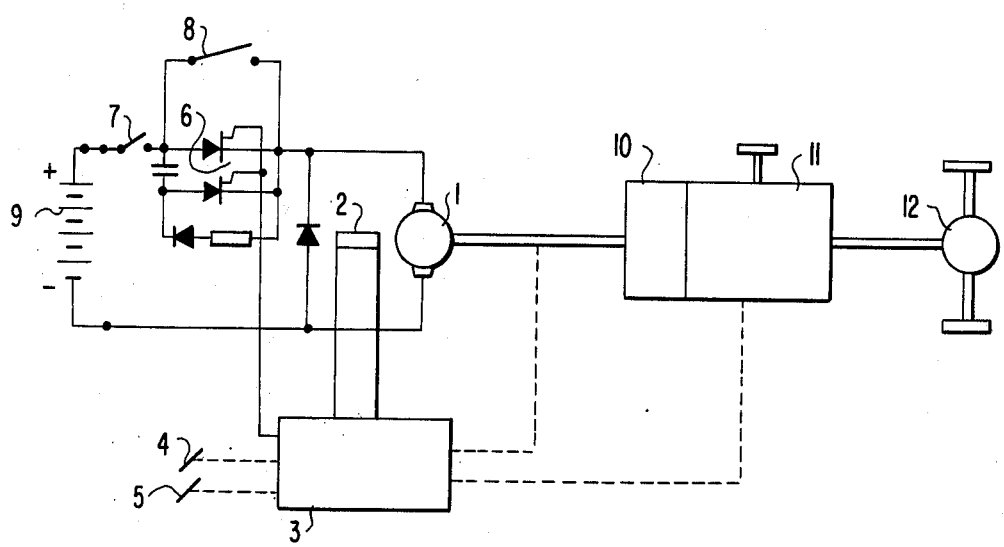
FIG. 1 is a schematic block diagram of a first embodiment of a drive aggregate for an electric vehicle in accordance with the present invention.

Referring now to the drawing wherein like reference numerals are used throughout the various views to designate like parts, and more particularly to FIG. 1, the block diagram of the first embodiment illustrated therein includes an electric shunt-wound motor 1, to be referred to hereinafter as shunt-motor, with its field coil 2 and an electronic control unit 3 which controls the armature current in dependence on a drive pedal 4 and a brake pedal 5 as well as on the motor- and transmission-rotational speed by way of the indicated armature current-regulating unit 6 and the energizing current in the field-winding 2. Since the electronic control unit 13 is of conventional construction, forming no part of the present invention, a detailed description is dispensed with herein for the sake of simplicity. The armature current regulating or control unit 6 is connected in series with a main contactor or relay 7 between the battery 9 and the motor 1; an auxiliary contactor or relay 8 is connected in parallel with the armature current control or regulating unit 6. The motor output shaft acts by way of a speed-reducing gear 10 on the automatic transission 11, whose output shaft drives the wheels by way of a differential gear 12.

The motor 1 is designed for a rated rotational speed of about 3,000 r.p.m. and for a maximum rotational speed of about 6,000 r.p.m. The speed-reducing gear 10 has a speed-reducing gear ratio of 2.4:1 so that input rotational speed of the automatic transmission within the field-weakening range of the motor 1 extends from about 1,250 to about 2,500 rpm. The automatic transmission of conventional construction has four speeds and a maximum transmission ratio of 4.3:1. The oil pressure for the hydraulically operated adjusting or actuating member is produced by a small electric motor 21 with constant rotational speed driven oil pump 22 (See FIG. 4). An overall control range for the vehicle of 8.6:1 results from this construction, which is covered exclusively by field control. The armature current regulating or control unit 6 is designed for a maximum current that corresponds to the rated torque of the motor.

The operating readiness of the drive is established by way of the main contactor 7. The starting in the first gear from the standstill of the motor 1 takes place with the aid of the armature current control or regulating unit 6 up to about 8 km/h. After reaching the rated rotational speed of the motor 1, the armature current control or regulating unit 6 is bridged by the auxiliary contactor 8 and the motor 1 can now produce its rated torque as also the permissive overload torques within the field-weakening range in all four speeds. The regenerative braking takes place by shifting back of the speeds exclusively within the field-weakening range. The automatic control of armature- and field-current by means of the electronic control unit 13 is not described in detail since it also is of conventional type.

Figure 2A:
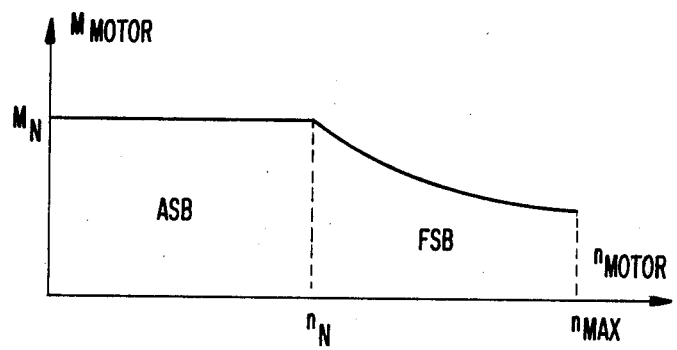
FIG. 2a is a diagram illustrating the drive characteristics of the drive aggregate of FIG. 1.

FIG. 2a illustrates the characteristics of the shunt-motor with the data indicated above in continuous operation (rated current). The armature adjusting range ASB extends from motor standstill to the rated rotational speed $n_N$ whereas the field-weakening range FSB extends from the rated rotational speed $n_N$ up to the maximum rotational speed $n_{MAX}$.

Figure 2B:
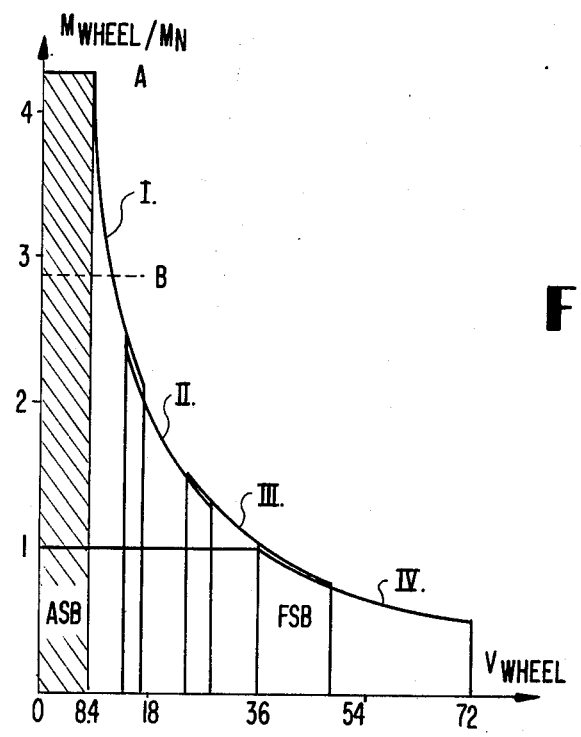
FIG. 2b is a diagram illustrating the engine characteristics for the drive aggregate illustrated in FIG. 1.

FIG. 2b illustrates the starting characteristics of the drive aggregate which results from the combination of the individual elements according to FIG. 1.

The wheel moment $M_{wheel}$, in relation to the rated engine torque $M_N$ as a function of the wheel or driving velocity $V_{wheel}$ can be seen from FIG. 2b for the individual speeds I, II, III, and IV. The cross-hatched part of 0 to 8.4 km/h illustrates the armature-regulating range ASB while the remaining part represents the field-weakening range FSB. The maximum ratio $M_{wheel}/M_N=4.3$ of the illustrated embodiment is designated by reference character A whereas reference character B represents the maximum ratio $M_{wheel}/M_n=2.92$ of a conventional aggregate with a field-weakening range of 3.25:1 and with an overload current of 1.8 times.

Figure 3:
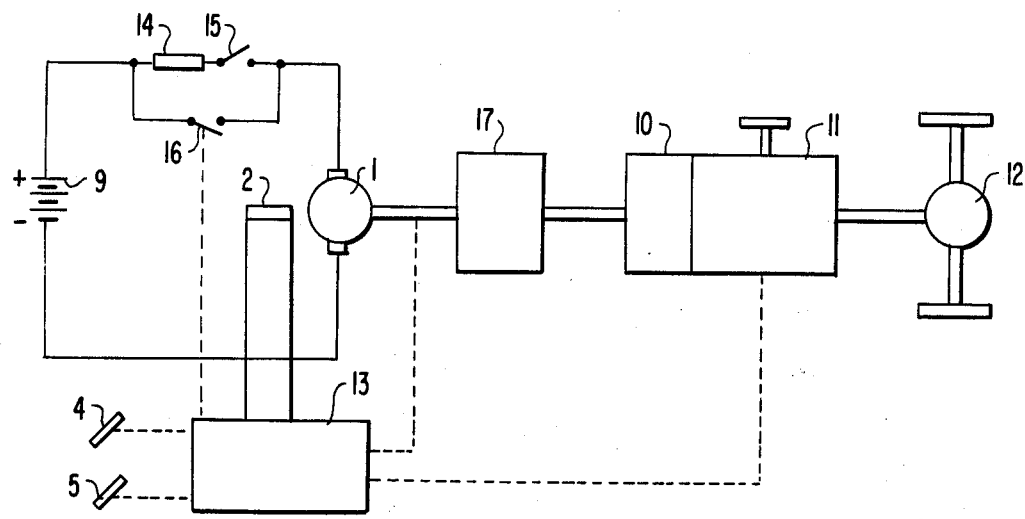
FIG. 3 is a schematic block diagram of a second embodiment of a drive aggregate for an electric vehicle in accordance with the present invention.

The block diagram of a second embodiment is illustrated in FIG. 3. It differs from the first embodiment of FIG. 1 in that the armature current control of the electronic control unit 13 and the armature current control unit or element 6 as well as the main contactor 7 and the auxiliary contactor 8 are dispensed with. In lieu thereof, only the field current is conventionally controlled by means of the electronic control unit 13. A starting resistance 14 is connected in series with the auxiliary contactor 15 between the battery 9 and the motor 1. A main contactor 16 is connected in parallel with this series circuit. Additionally, a hydrodynamic coupling 17 is connected between the motor 1 and the speed-reducing gear 10. The driving motor is started by way of the starting resistance 14 and rotates in idling. Upon actuation of the drive pedal 4, after reaching the rated rotational speed, the resistance 14 is short-circuited by means of the main contactor 16 and the vehicle is set into motion in the field-weakening range by way of the hydrodynamic coupling 17. The acceleration, the speed change and the energy regeneration now take place as in the first embodiment. When dropping below the rated rotational speed, the main contactor 16 is opened and as a result thereof, the starting resistance $R_1$ is again interconnected in order that the idling torque remains limited.

Figure 4:
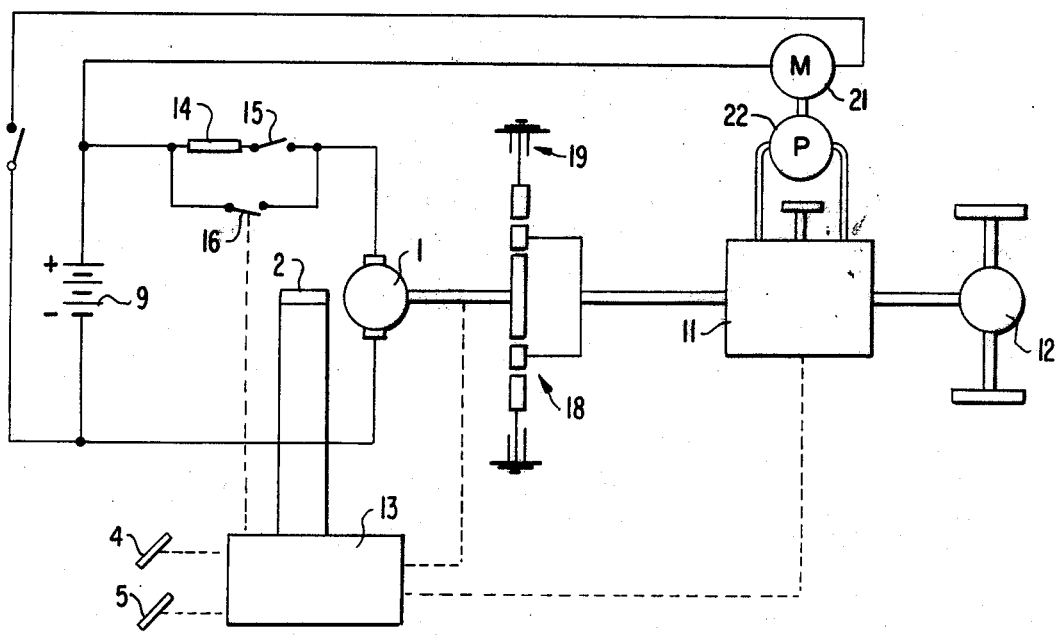
FIG. 4 is a schematic block diagram of a third embodiment of a drive aggregate for an electric vehicle in accordance with the present invention.

FIG. 4 illustrates a block diagram of a third embodiment. This embodiment is constructed essentially in the same manner as the second embodiment of FIG. 3, only the hydrodynamic coupling 17 and the speed-reduction gear 10 of FIG. 3 are replaced in this embodiment by a planetary gear set generally designated by reference numeral 18 with a lamellae brake generally designated by reference numeral 19. The lamellae brake 19 holds fast the external ring of the planetary gear set 18 when the vehicle is to start. The lamellae brake 18 is actuated hydraulically by the oil pressure supply of the automatic transmission 11 by conventional means. All of the remaining functions take place as in the second embodiment.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a drive aggregate for electric vehicles of the type comprising an electric shunt motor with a field winding and field current control for adjusting the motor speed by field regulation. and a change-speed transmission having plural stepped speed ratios, said change-speed transmission being connected with the shunt motor, the improvement in that the shunt motor has a relatively high rated rotational speed in relation to its maximum rotational speed and a relatively reduced field-weakening range, wherein a speed reduction transmission is provided, said speed reduction transmission interconnecting said shunt motor with said change-speed transmission, and wherein said change-speed transmission is a hydraulic automatic change-speed transmission.

2. A drive unit according to claim 1, characterized in that the electric vehicle is a trackless street vehicle.

3. A drive aggregate according to claim 1, characterized in that an armature current control is provided which is designed for an armature current substantially coordinated to the rated torque of the overall drive.

4. A drive aggregate according to claim 3, characterized in that the armature current control is devoid of any regenerative braking arrangement.

5. A drive aggregate according to claim 1, characterized in that a series circuit including a starting resistance and an auxiliary contactor is provided in the armature current circuit, and in that a main contactor is connected in parallel with said series circuit.

6. A drive aggregate according to claim 5, characterized in that the main contactor is actuated by a drive switch.

7. A drive aggregate according to claim 5, characterized in that the speed reduction transmission comprises a hydrodynamic coupling.

8. A drive aggregate according to claim 5, characterized in that the speed reduction transmission comprises a hydrodynamic torque converter.

9. A drive aggregate according to claim 1, wherein said automatic transmission is provided with a maximum transmission ratio of approximately 4.3:1, the speed reduction transmission is provided with a speed-reducing ratio of 2.4:1, and the shunt motor is provided with a rated rotational speed of about 3,000 r.p.m. with a maximum rotational speed of 6,000 r.p.m. so as to provide an overall control range of 8.6:1 achieved by field control.

10. A drive aggregate according to claim 1, wherein said speed reduction transmission is arranged so as to directly receive the output of said shunt motor throughout the entire operating range of the motor so as to cause the whole change-speed transmission to operate at a lower speed.

11. In a drive aggregate for electric vehicles of the type comprising an electric shunt motor with a field winding and field current control for adjusting the motor speed by field regulation, and a change-speed transmission having plural stepped speed ratios, said change-speed transmission being connected with the shunt motor, the improvement in that the shunt motor has a relatively high rated rotational speed in relation to its maximum rotational speed and a relatively reduced field-weakening range, wherein a speed reduction transmission is provided, said speed reduction transmission interconnecting said shunt motor with said change-speed transmission, and wherein said change-speed transmission is an automatic change-speed transmission, characterized in that a series circuit including a starting resistance and an auxiliary contactor is provided in the armature current circuit, in that a main contactor is connected in parallel with said series circuit, and in that said speed reduction transmission comprises a planetary gear arrangement arranged between the shunt motor and the automatic change-speed transmission.

12. A drive aggregate according to claim 11, characterized in that the planetary gear arrangement includes lamellae brake means for holding fast the reaction element of the planetary gear arrangement during starting of the vehicle.

13. A drive aggregate according to claim 12, characterized in that the main contactor is actuated by a drive switch.

14. In a drive aggregate for electric vehicles of the type comprising an electric shunt motor with a field winding and field current control for adjusting the motor speed by field regulation, and a change-speed transmission having plural stepped speed ratios, said change-speed transmission being connected with the shunt motor, the improvement in that the shunt motor has a relatively high rated rotational speed in relation to its maximum rotational speed and a relatively reduced field-weakening range, wherein a speed reduction transmission is provided, said speed reduction transmission interconnecting said shunt motor with said change-speed transmission, and wherein said change-speed transmission is an automatic change-speed transmission, and the automatic transmission is provided with an oil pump driven at substantially constant rotational speed by an electric motor connected thereto.

* * * * *